United States Patent
Sato

[11] 3,726,162
[45] Apr. 10, 1973

[54] NUMERICALLY CONTROLLED LATHE

[75] Inventor: Yoshikazu Sato, Tokyo, Japan

[73] Assignee: Nippon Seiko Kabushiki Kaisha, Tokyo, Japan

[22] Filed: Dec. 16, 1970

[21] Appl. No.: 98,664

[30] Foreign Application Priority Data

Dec. 27, 1969 Japan..............................44/104849
Oct. 2, 1970 Japan................................45/85853

[52] U.S. Cl.............................................82/3, 29/37
[51] Int. Cl. ..............................................B23b 9/00
[58] Field of Search..............................82/2, 3, 2.5; 408/36, 53; 29/27, 37; 90/13.99

[56] References Cited

UNITED STATES PATENTS

| | | | |
|---|---|---|---|
| 3,015,806 | 1/1962 | Wang et al. | 90/13 C |
| 2,911,868 | 11/1959 | Thomson, Jr. | 82/2 |
| 2,611,290 | 9/1952 | Bullard III | 82/3 |
| 2,377,383 | 6/1945 | Slovak | 82/2.5 |
| 3,442,175 | 5/1969 | Heap et al. | 408/53 X |

*Primary Examiner*—Leonidas Vlachos
*Attorney*—Marn & Jangarathis

[57] ABSTRACT

A numerical control lathe of the invention includes a head stock containing a main spindle and its driving means and having a workpiece positioned thereon by a chuck, and a took post having a tool mount having no indexing function, a vertical slide and a saddle movable back and forth with respect to the bed along X-axis. The vertical slide is driven to move vertically along Y-axis. The vertical slide is driven to move vertically along Y-axis on the saddle by a driving means and the saddle is driven by other driving means. Said head stock moves along Z-axis. This invention also provides an automatic multiple spindle numerical control lathe. In this case, the main tool post having two or more control axes movable in accordance with a command from the numerical control means; a plurality of auxilliary tool posts fixed to the main tool post; work spindle means equal in number to the auxiliary tool posts are provided. Workpieces chucked by work spindle means are machined simultaneously.

3 Claims, 13 Drawing Figures

NUMERICALLY CONTROLLED LATHE

BACKGROUND OF THE INVENTION

This invention relates to a numerically controlled lathe which comprises, in combination, numerical control means and a lathe.

A numerical control lathe provides a wide economical range of production scale from a small-scale production to a mass production owing to the shorter time required for programming and the greater ease to change the types of workpiece to be machined than in a universal lathe, and to the readiness for desired programming which results in a higher productivity than that of an automatic lathe. It is also featurized by excellent characteristics such as high accuracy of performance and less irregular quality of its products obtained through repeated production processes. On the other hand, however, the presence of numerical control means and driving means including servo mechanisms, ball screws, etc. leads to a very much higher cost than that of the universal lathe. Also, in the case of mass production, the fact that a plurality of lathes can be controlled by a single numerical control means may be considered useful to reduce the cost per numerical control means, but the truth is that the cost is not absolutely reduced because, in that case, there occurs such a change in program that the cost of that single numerical control means becomes far higher than that of a numerical control means designed for controlling a single lathe and because the drive means, which is expensive in itself, requires two or three control axes for each lathe irrespective of the number of control means in use. Further, from the standpoint of mass production, an automatic multiple lathe would be available, whereas it requires a much longer time for programming than the universal lathe and suffers from such limitations that, in case of an ordinary construction thereof, each spindle is driven, after all, at a number of revolutions determined by the cutting speed for the worst processing condition, in spite of the effort to divide the workpiece processing step into a number of sub-steps equal to the number of the spindles and distribute the time as uniformly as possible for each of these sub-steps. Thus, cutting may not be effected in the optimal conditions for the respective sub-steps to thereby reduce the productivity, and from the economical point of view, the cost remains substantially the same as that of the numerical control lathe.

Furthermore the known numerical control lathes are usually of such construction that the path of a cutting edge (the relative position between a workpiece and the cutting edge) is controlled in a single plane containing the center line of the workpiece to machine the workpiece into a desired shape and size. For example, the construction is such that the level of the cutting edge is substantially registered with the center line of the main spindle, usually the center line of the workpiece, whereupon the cutter is controlled longitudinally and laterally thereof so that the edge of the cutter is always moved in a single plane (hereinafter referred to as the cutter's plane of path). Also, in a numerically controlled lathe, as many cutting tools as possible must be provided to effect machining of various shapes with high efficiency and these tools must be successively brought into their machining positions lying in the said single plane. For this purpose, a plurality of cutting tools mounted on a rotary indexing type tool post usually known as a turret are arranged so that any desired one of them may be indexed into its machining position with the aid of numerical control. These tools, the number of which may be six to eight, may be disposed radially of the turret if the latter is of the ordinary type, or may be disposed either parallel to the rotary indexing spindle or along the bus lines of a cone if the turret is of a special type. In either case, however, the presence of an indexing mechanism serves to reduce the rigidity of the machine, and especially in the turret of the most common type having radially arranged cutting tools, the length of each tool (i.e. the amount of overhang as measured from the indexing center) is made greater to avoid the occurrence of any interference between the workpiece and an adjacent tool, which may result in a further reduced rigidity. In addition, the indexing accuracy is reduced during a long-term use of the machine, and this adversely affects the machining accuracy of the tools.

SUMMARY OF THE INVENTION

It is an object of the present invention to provide a numerical control lathe which is capable of highly efficient and highly accurate machining operation during a long term. To achieve such object, the numerical control lathe of the present invention comprises a head stock, and a tool post having a tool mount having no indexing function, one or both of said head stock and said tool post being installed so as to be controllable along three or more numerical control axes, whereby two or more cutter's planes of path are provided by two of said numerical control axes.

According to one aspect of the present invention it is provided that an automatic multiple spindle numerical control lathe which utilizes the characteristics of the existing numerical control lathe without changing the number and program of its numerical control means and driving means while increasing the number of work spindles to reduce the cost of the numerical control means and driving means for each work spindle to a fraction of the prior cost, thus eliminating the various disadvantages inherent to the numerical control lathe.

According to further aspect of this invention it is provided that an automatic multiple spindle numerical control lathe which utilizes the characteristics of the automatic multiple spindles lathe suitable for mass production provided with a number of work spindles and automatic feeder means for feeding blanks to each work spindle, while solving the aforesaid disadvantages in productivity and cost inherent to the automatic multiple spindle lathe.

Thus according to the present invention, an automatic multiple spindle numerical control lathe whose production scale is in a wide economical range from a small-scale production to a mass production.

The automatic multiple spindle numerical control means and a lathe, said lathe comprising a main tool post having two or more control axes movable in response to a command from said numerical control means, a plurality of auxiliary tool posts fixed to said main tool post, work spindle means equal in number to said auxiliary tool posts and mounted for rotation in opposed relationship with said auxiliary tool posts, and automatic feeder means for feeding blanks to each of said work spindle means, whereby workpieces chucked by said respective work spindle means may be machined simultaneously in the same portions thereof by one or more cutting tools attached to said respective auxiliary tool posts to thereby provide products equal in number to said auxiliary tool posts.

The invention will be described referring to illustrative embodiments shown in the attached drawing:

BRIEF EXPLANATION OF THE DRAWING

FIG. 7 shows its front view, FIG. 8 shows its plan view, FIG. 9 shows a front view of the main tool post, FIG. 10 shows a side elevation of the main tool post as viewed from the right-hand side thereof, FIG. 11 shows a similar drawing but viewed from the left-hand side thereof, FIG. 12 shows a side elevation of the head stock as viewed from the main tool post, and FIG. 13 is a partially cross-sectional view of the work spindle means, the drive shaft means and the automatic feeder means.

DESCRIPTION OF THE PREFERRED EMBODIMENTS

Figure 1:
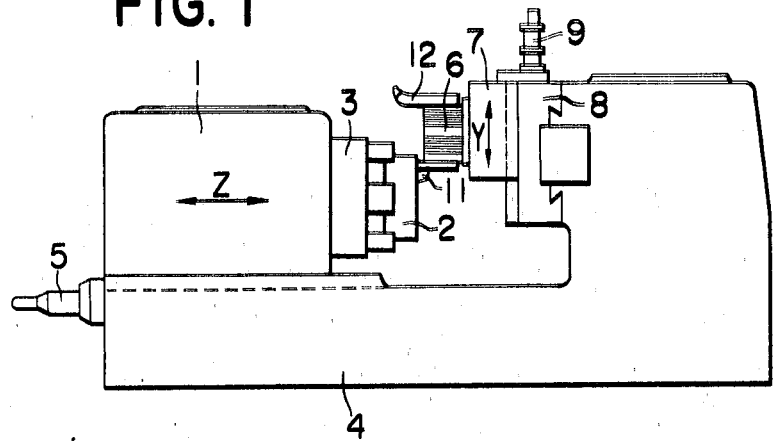
FIG. 1 is a front view of the single spindle lathe according to an embodiment of the present invention.
Figure 2:
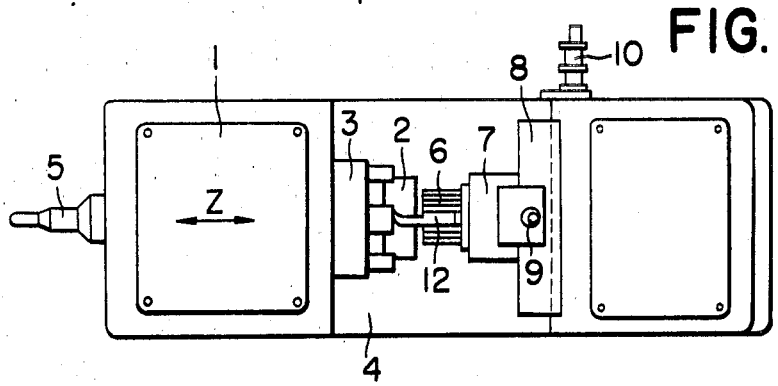
FIG. 2 is a plan view thereof.

In a first embodiment as shown in FIGS. 1 to 6, a head stock 1 containing therein a main spindle and its driving means and so on has a workpiece 2 positioned thereon by means of a chuck 3, and is driven to move on a bed 4 by Z-axis driving means 5 in the direction along the main spindle (i.e., along the numerical control Z-axis). The tool post comprises a tool mount 6 having no indexing function, a vertical slide 7 having the tool mount fixed thereto by suitable means, and a saddle 8 movable forwardly and backwardly (along the numerical control X-axis) with respect to the bed 4. The vertical slide 7 is driven to move vertically (along the numerical control Y-axis) on the saddle 8 by Y-axis driving means 9, and the saddle 8 is driven by X-axis driving means 10.

Figure 3:
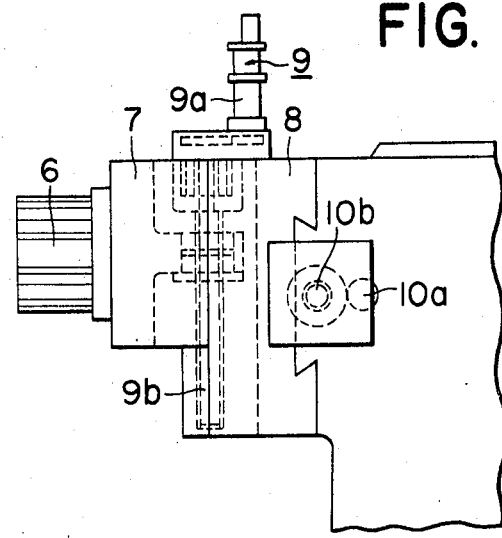
FIG. 3 is an enlarged view of the tool post.
Figure 4:
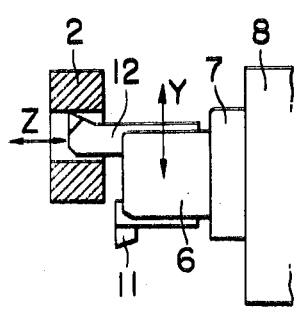
FIGS. 4 and 5 illustrate the different planes of path followed by the various cutting tools.
Figure 5:
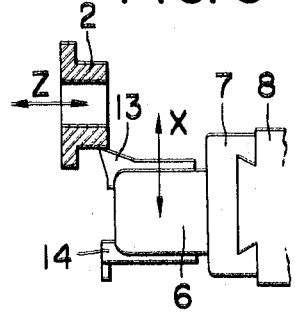

As shown in FIG. 3, the Y-axis driving means 9 and the X-axis driving means 10, similarly to the Z-axis driving means 5, comprise servo mechanisms 9a, 10a movable in response to a command from numerical control means (not shown), and ball screws 9b, 10b, and the three axes may be movable discretely or two or three of these axes may be movable simultaneously. The Z-axis represents the movement of the head stock 1, the Y-axis represents vertical movement of the vertical slide 7 and the X-axis represents the reciprocal movement of the saddle 8. Since the tool mount 6 has no indexing function, the positioning of an appropriate cutting tool with respect to a portion of the workpiece to be machined thereby is accomplished by moving the head stock 1 and tool post with the aid of the three driving means 5, 9 and 10. For example, after the end face machining effected by a facing tool 11 as shown in FIG. 1, if it is desired to effect boring by means of a boring tool 12, the Z-axis driving means 5 and the Y-axis driving means 9 may be operated so that the vertical plane formed by the Z and Y axes may provide a plane of path for the boring tool, to thereby bring about the condition for boring as shown in FIG. 4. In order to use another cutting tool 13 in a plane formed by the X and Z axes, the Z-axis driving means 5 and the X-axis driving means 10 may be operated to effect the desired machining.

Figure 6:
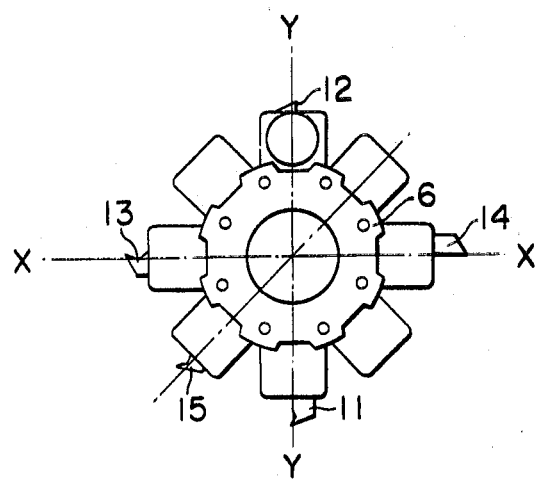
FIG. 6 is a side elevation of the tools of FIGS. 4 and 5 as viewed from the main spindle of the tool post and illustrating the arrangement of the tools.
Figure 7:
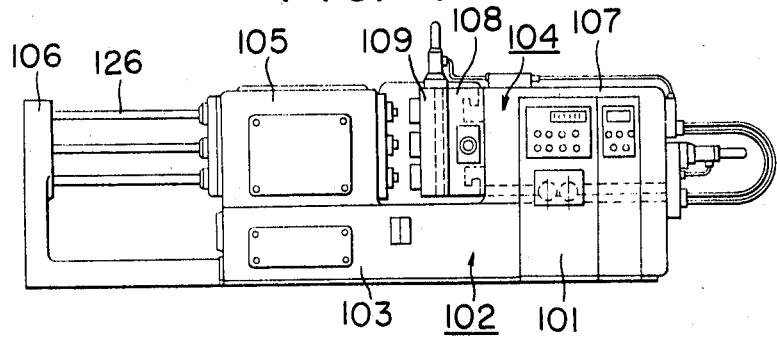
FIGS. 7 through 13 show the multiple spindle lathe according to another embodiment of the present invention.
Figure 8:
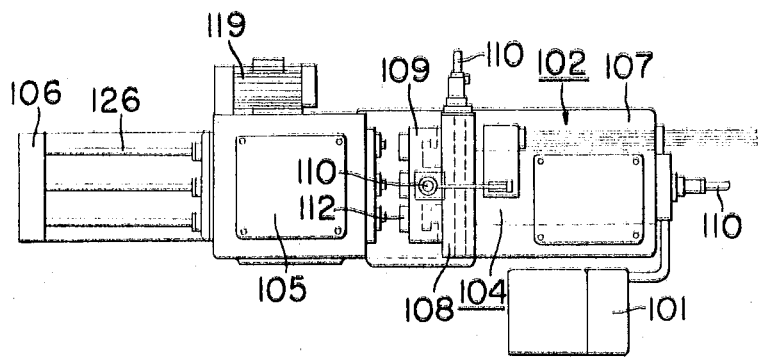

In FIG. 6, there is shown an example of the tool mount in which the various cutting tools 11, 12 and 13 are radially fixed to the tool mount 6 with their cutting edges directed outwardly. In addition to cutters 13, 14 positioned on the line X—X and cutters 11, 12 positioned on the line Y—Y, a cutter 15 is further positioned on a line forming an angle of 45° with respect to the said two lines. These cutting tools may be brought to their respective machining positions by controlling the X and Y axes either simultaneously or discretely. Eight cutting tools may be attached to the tool mount 6 as seen in FIG. 6, although in FIGS. 1 to 6 some of these cutting tools are not shown for convenience of description.

Figure 9:
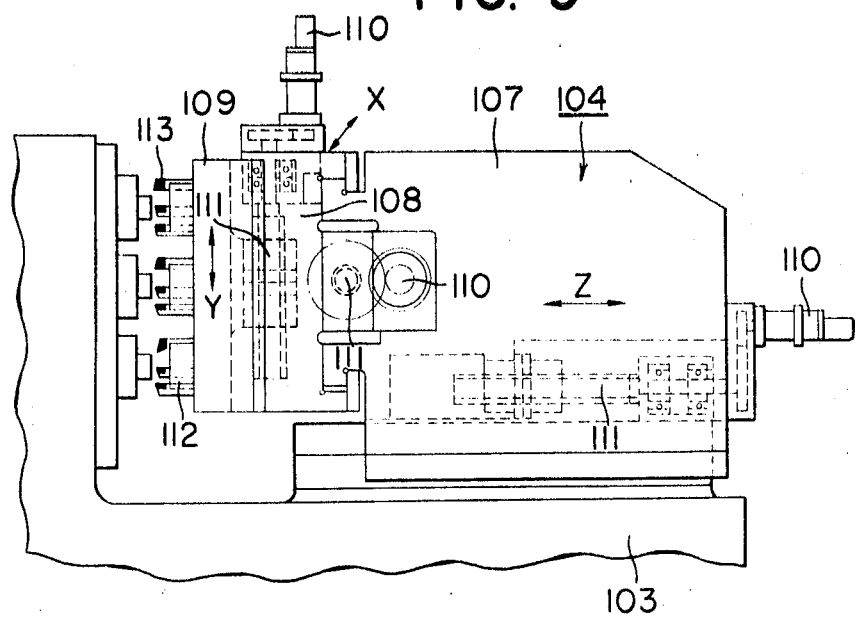
Figure 10:
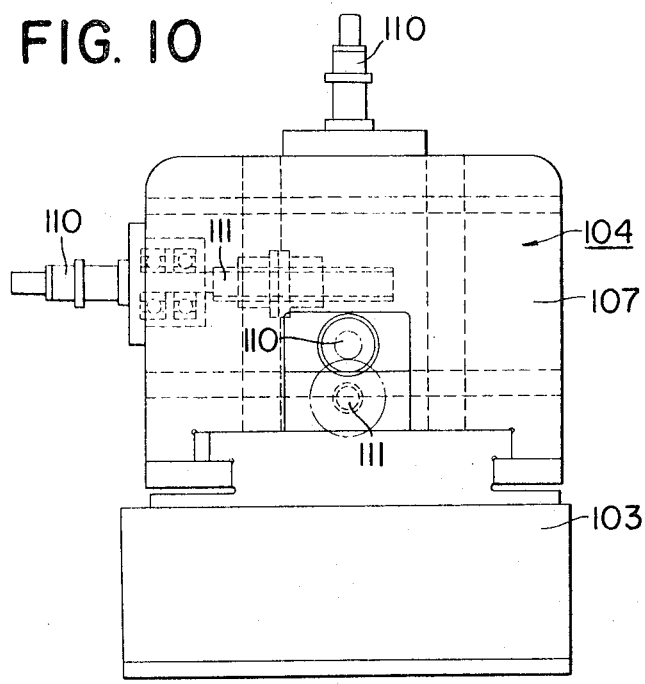
Figure 11:
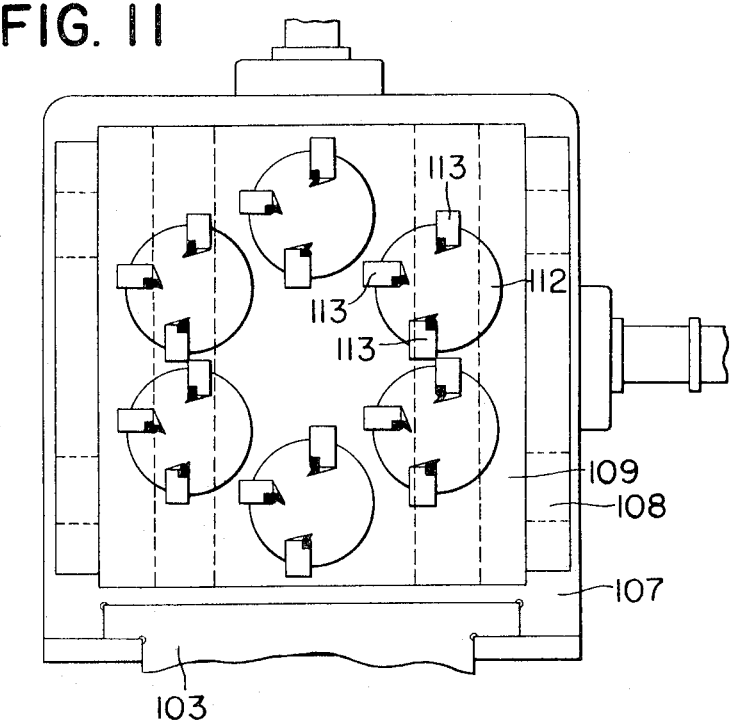
Figure 12:
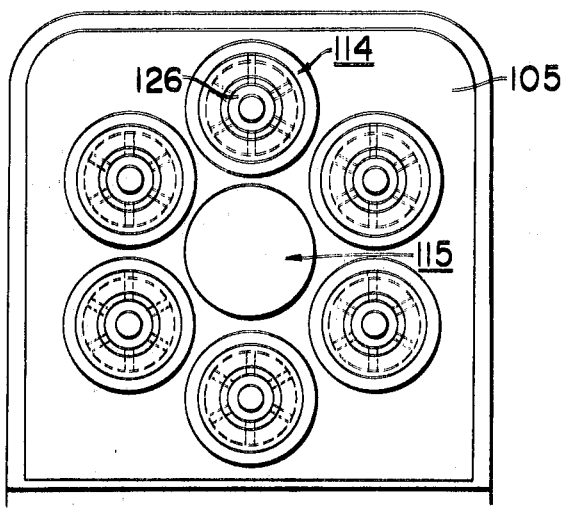
Figure 13:
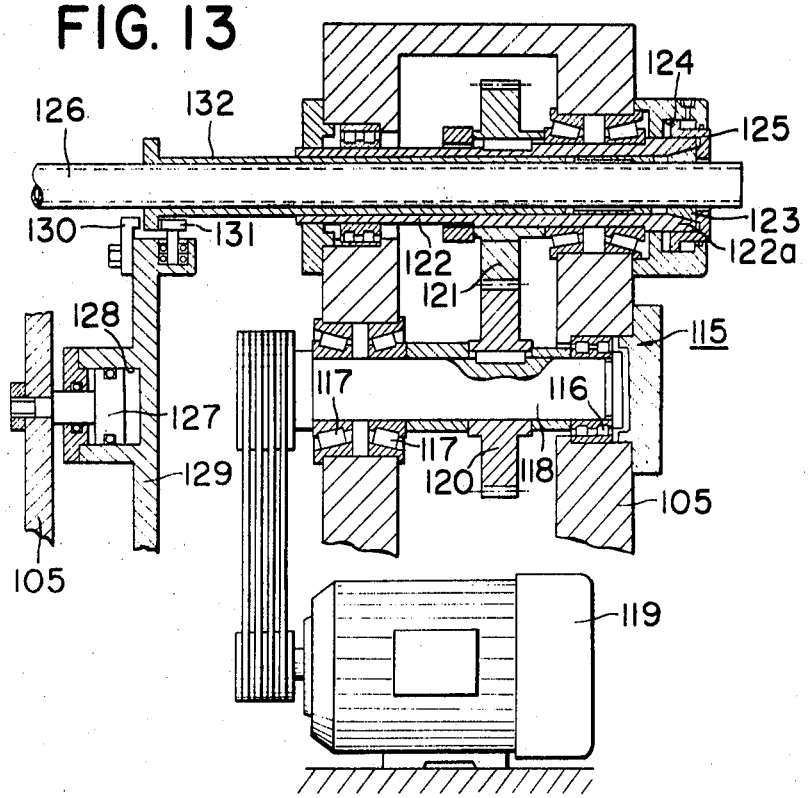

In a second embodiment as shown in FIGS. 7 to 13, the automatic multiple spindle numerical control lathe of the present invention comprises a single numerical control means 101 and a lathe 102 provided with driving means operable in response to a command from the numerical control means. The numerical control means 101 may be of any commercially available type but it has a function suitably selected to control two, three or more control shafts depending on the type of work to be done by the lathe. The lathe 102 is shown as a six-spindle bar machine, whereas in FIGS. 7, 8 and 9 it is of four-spindle type for a better understanding. On a lathe bed 103 there is a main tool post 104 rightwardly of the bed as viewed in these figures, and a head stock 105 leftwardly of the bed. Numeral 106 designates the bar stand of an automatic blank feeder means. The main tool post 104 may have a number of control shafts corresponding to the function of the control means, and herein it is shown to have three control axes (X, Y, Z). As shown in FIGS. 9 and 10, it generally comprises a z-axis slide 107 slidable on the bed 103 longitudinally thereof, an X-axis slide 108 slidable forwardly and backwardly on the Z-axis slide, and a Y-axis slide 109 slidable vertically on the X-axis slide. These slides 107, 108 and 109 may be driven discretely or simultaneously by three driving means comprising servo mechanisms 110, ball screws 111 and so on. Suitably fixed to the Y-axis slide 109 are six auxiliary tool posts 112, each of which has three cutting tools 113 attached thereto all in the same way. The cutting tools 113 have configurations selected in accordance with such factors as the shapes of workpieces and the programmed machining processes, and the number of the cutting tools 113 may be one or more. The auxiliary tool posts 112 have their tool mount portions determined by the number of the cutting tools 113. The auxiliary tool posts 112 are also shown to be positioned at six equally spaced locations on a common circle, whereas their positions are not limited to such equally spaced locations on a common circle insofar as no interference occurs between the cutting tools 113. On the other hand, the head stock 105 carries thereon six work spindle means 114, a drive shaft means 115 for driving the work spindle means 114, and a portion of the automatic blank feeder means. As shown in FIG. 12, the work spindle means 114 are opposed to the respective auxiliary tool posts 112 and driven to rotate by the drive shaft means 115. The drive shaft means 115, as shown in FIG. 13, is composed chiefly of a drive shaft 118 rotatably journalled to the head stock 105 by means of bearings 116 and 117, and its rotation is imparted by a pole change motor 119. The drive shaft 118 has a gear 120 secured thereto and engaging a gear 121 on the work spindle means 114 so as to transmit the rotation of the drive shaft 118 to the work spindle means 114. Similarly to the drive shaft means, the work spindle means 114 is also journalled to the head stock 105 so that it is not indexed for displacement as in the conventional automatic multiple spindle lathes but that it is rotated at its predetermined fixed position on the head stock 105. A work spindle 122 to which is fixed the gear 121 is cylindrically shaped because the present embodiment is a bar machine, and that end of the work spindle 122 which is adjacent to the auxiliary tool post 112 forms a tapered sleeve 122a for a collet chuck. A spring collet 123 is fitted into the tapered sleeve 122a so that it is pushed at its end face by a chuck piston 125 fitted in a hydraulic cylinder 124 so as to chuck a workpiece 126. The major part of the automatic blank feeder means is also disposed in the leftward interior of the head stock 105, and a feeder piston 127 displaces rightwardly and leftwardly a support plate 129 including a hydraulic cylinder 128. Mounted on the support plate 129 are a push plate 130 and a roller 131 for each work spindle, in such a manner that the flange portion of a feeder tube 132 fitted in the work spindle 122 is interposed between the push plate 129 and the roller 130. That end of the feeder tuber 132 which is adjacent to the chuck is divided by slitting and hardened so that the inner diameter thereof is smaller than the outer diameter of the workpiece 126. For this reason, the workpiece 126 is fitted within the feeder tube 132 in such a manner as to forcibly enlarge that end of the tube which is adjacent to the chuck.

If a hydraulic pressure is applied to the cylinder chamber on the right-hand side of the feeder piston 127 before the workpiece 126 is chucked by the spring collet 123, then the support plate 129 will be moved rightwardly so that the push plate 130 will push the flange portion of the feeder tube 132, thereby forcing the workpiece 126 in the feeder tube 132 to be displaced rightwardly to a cutting position. Subsequently, a hydraulic pressure is applied to the cylinder chamber on the right-hand side of the chuck piston 125 so as to chuck the workpiece 126, and thereafter a hydraulic pressure is applied to the cylinder chamber on the left-hand side of the feeder piston 127, so that the support plate 129 is moved leftwardly and accordingly the roller 131 forces the flange portion of the feeder tube 132 leftwardly. At this stage, the clamping force of the spring collet 123 is greater than that of the said end of the feeder tube 132, and therefore the workpiece 126 is rotated without displacement while the feeder tube 132 alone is displaced leftwardly. The change-over of the hydraulic pressures applied to the aforesaid two different hydraulic cylinders 124 and 128 is accomplished by a change-over valve responsive to the movement of the main tool post 104, and thus the workpiece 126 may be automatically fed through repetition of the described operation. It will be seen that the end of the workpiece 126 which protrudes leftwardly beyond the head stock 105 may be supported by the bar stand 106.

In the thus constructed automatic multiple spindle numerical control lathe of the present invention, only a single main tool post is under numerical control and a number of workpieces equal to the number of auxiliary tool posts can be processed simultaneously. Thus, the same mass production effect as in the case where the number of the lathes under numerical control is equal to that of the auxiliary tool posts can be attained by a single lathe without changing the number and program of the numerical control means and driving means, and this means that the cost of the numerical control means and driving means is reduced to a fraction of the prior cost and accordingly the economical disadvantage of the numerical control lathe is eliminated. Further, assuming that several, say, six numerical control lathes can be operated by a single operator, only one operator is required for at least two of the automatic six-spindle numerical control lathes according to the present invention, which means a sharp increase in the production rate per man-hour. Furthermore, in the automatic multiple spindle numerical control lathe of the present invention, no such indexing occurs as has been usual with the cutting tools in the prior art numerical control lathe or with the work spindles in the prior art automatic multiple spindle lathe, so that the real machining time is increased without loss of time and without wasteful movement of the cutting tools. Moreover, as compared with the automatic multiple spindle lathes of the prior art, productivity is greatly enhanced because no limitation is present in the cutting speed. Also, the need to provide gearing, camming and like mechanisms for indexing and displacing the cutting tools, which mechanisms have occupied a greater percentage of the total cost, is eliminated to thereby greatly reduce the cost of the entire machine. The work spindles having no indexing function also serve to eliminate the problem of reduced accuracy which would otherwise occur after a long-term use, and this leads to a greater ease of maintenance. A further advantage of the present invention is that the extremely short time required for programming matches a small-scale production while the use of the multiple spindles matches a mass production, which means a wide economical range of production scale from a small-scale production to a mass production, and accordingly a high efficiency of investment.

While the above embodiment has been shown as a six-spindle bar machine, the number of spindles may be four, eight or any other suitable number. Also, it will be apparent that the automatic feeder means may comprise a hopper and loading means so as to serve also as a chuck, and that the pole change motor may be replaced by a known drive shaft change gear to obtain the same result.

I claim:

1. An automatic control lathe including a numerical control means, a main tool post, a headstock means and a drive means therefor, the improvement comprising:

a plurality of auxiliary tool posts mounted on said main tool post, each of said tool posts having a plurality of tools mounted thereon;

a plurality of rotatable work spindle means disposed on said headstock means and facing a respective auxiliary tool post on said main tool post, each of said spindle means including a chuck for a workpiece;

control means for moving said main tool post in three directions in accordance with instructions from said numerically controlled means to position a tool on each auxiliary tool post in a plane passing through the center of each workpiece whereby each workpiece is successively cut by said tools located on a plurality of parallel spaced planes to simultaneously work on each workpiece.

2. The apparatus as defined in claim 1 wherein the number of workpieces equal the number of auxiliary tool posts.

3. The apparatus as defined in claim 1 wherein a feeder is provided to automatically feed blanks into said spindle means.

* * * * *